United States Patent
Dudley et al.

(10) Patent No.: US 8,790,773 B2
(45) Date of Patent: Jul. 29, 2014

(54) TAILORABLE DIELECTRIC MATERIAL WITH COMPLEX PERMITTIVITY CHARACTERISTICS

(75) Inventors: Kenneth L. Dudley, Newport News, VA (US); Holly A Elliott, Newport News, VA (US); John W. Connell, Yorktown, VA (US); Joseph G. Smith, Smithfield, VA (US); Sayata Ghose, Newport News, VA (US); Kent A. Watson, New Kent, VA (US); Donavon Mark Delozier, Disputanta, VA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 716 days.

(21) Appl. No.: 12/174,360

(22) Filed: Jul. 16, 2008

(65) Prior Publication Data
US 2009/0022977 A1 Jan. 22, 2009

Related U.S. Application Data

(60) Provisional application No. 60/961,330, filed on Jul. 20, 2007.

(51) Int. Cl.
*B32B 5/16* (2006.01)
*C08K 3/08* (2006.01)

(52) U.S. Cl.
USPC .............................. 428/323; 428/328; 524/413

(58) Field of Classification Search
USPC ................................................ 428/323, 328
See application file for complete search history.

(56) References Cited

U.S. PATENT DOCUMENTS

| | | | | |
|---|---|---|---|---|
| 6,146,227 A | * | 11/2000 | Mancevski | 445/24 |
| 6,538,367 B1 | * | 3/2003 | Choi et al. | 313/309 |
| 6,579,564 B2 | | 6/2003 | Chen et al. | |
| 6,624,109 B2 | | 9/2003 | Murthy et al. | |
| 6,630,772 B1 | * | 10/2003 | Bower et al. | 313/311 |
| 6,800,584 B2 | | 10/2004 | Baker et al. | |
| 6,846,345 B1 | * | 1/2005 | Keller et al. | 75/255 |
| 6,919,065 B2 | | 7/2005 | Zhou et al. | |
| 6,958,308 B2 | | 10/2005 | Brown | |

(Continued)

OTHER PUBLICATIONS

Han et al. (A Direct Route toward Assembly of Nanoparticle-Carbon Nanotube Composite Materials, Langmuir, 2004, 20, 6019-6025).*

(Continued)

*Primary Examiner* — Alicia Chevalier
*Assistant Examiner* — Alexandre Ferre
(74) *Attorney, Agent, or Firm* — Jennifer L. Riley

(57) ABSTRACT

A dielectric material includes a network of nanosubstrates, such as but not limited to nanotubes, nanosheets, or other nanomaterials or nanostructures, a polymer base material or matrix, and nanoparticles constructed at least partially of an elemental metal. The network has a predetermined nanosubstrate loading percentage by weight with respect to a total weight of the dielectric material, and a preferential or predetermined longitudinal alignment with respect to an orientation of an incident electrical field. A method of forming the dielectric material includes depositing the metal-based nanoparticles onto the nanosubstrates and subsequently mixing these with a polymer matrix. Once mixed, alignment can be achieved by melt extrusion or a similar mechanical shearing process. Alignment of the nanosubstrate may be in horizontal or vertical direction with respect to the orientation of an incident electrical field.

14 Claims, 8 Drawing Sheets

(56) References Cited

U.S. PATENT DOCUMENTS

| | | | |
|---|---|---|---|
| 6,975,063 B2* | 12/2005 | Mao et al. | 313/309 |
| 7,060,510 B2* | 6/2006 | Bonnell et al. | 438/3 |
| 7,068,898 B2* | 6/2006 | Buretea et al. | 385/123 |
| 7,119,161 B2* | 10/2006 | Lawandy | 528/190 |
| 7,365,100 B2* | 4/2008 | Kuper et al. | 516/32 |
| 7,560,134 B2* | 7/2009 | Yaniv et al. | 427/77 |
| 7,670,831 B2* | 3/2010 | Lee et al. | 435/283.1 |
| 2003/0008123 A1* | 1/2003 | Glatkowski et al. | 428/294.4 |
| 2003/0151030 A1* | 8/2003 | Gurin | 252/502 |
| 2005/0090387 A1 | 4/2005 | Niihara et al. | |
| 2005/0176989 A1 | 8/2005 | Coleman et al. | |
| 2005/0176990 A1 | 8/2005 | Coleman et al. | |
| 2005/0218377 A1* | 10/2005 | Lawandy | 252/299.01 |
| 2005/0220988 A1 | 10/2005 | Dodelet et al. | |
| 2006/0229466 A1 | 10/2006 | Arhancet et al. | |
| 2007/0106006 A1 | 5/2007 | Cooper et al. | |
| 2007/0292699 A1 | 12/2007 | Watson et al. | |

OTHER PUBLICATIONS

Day et al. (Electrochemical Templating of Metal Nanoparticles and Nanowires on Single-Walled Caron Nanotube Networks., J. Am. Chem. Soc. 2005, 127, 10639-10647).*

Slava et al. (Influence of External Electric Fields on Electronic Response and Bandstructure of Carbon Nanotube, Nanotechnology, 2003. IEEE-NANO 2003 Third IEEE Conference on Aug. 12-14, 2003).*

* cited by examiner

TAILORABLE DIELECTRIC MATERIAL WITH COMPLEX PERMITTIVITY CHARACTERISTICS

CROSS REFERENCE TO RELATED APPLICATION

This application claims priority to and the benefit of U.S. Provisional Application 60/961,330, filed on Jul. 20, 2007, which is hereby incorporated by reference in its entirety.

ORIGIN OF THE INVENTION

This invention was made in part by employees of the United States Government and may be manufactured and used by or for the Government of the United States of America for governmental purposes without the payment of any royalties thereon or therefor.

FIELD OF THE INVENTION

The present invention relates to an engineered material or dielectric material having tailorable electrical characteristics, and in particular to an optimized dielectric material having a preferentially-aligned network of nanomaterials or nanosubstrates with a predetermined loading percentage of metallic nanoparticles.

DESCRIPTION OF THE RELATED ART

Nanomaterials, nanostructures, or nanosubstrates are materials having at least one dimension that is measurable on the nanometer (nm) or nanoscale, ordinarily approximately 1 nm to approximately 100 nm. For example, a nanosubstrate in the form of a thin film or sheet might have a thickness of approximately 1 nm to approximately 100 nm, with a relatively larger length and/or width, such as might be more readily measurable using a micron scale. Likewise, a nanotube can have a nanoscale diameter, with a corresponding length of a few microns or more. Other nanosubstrates having complex geometry include nanohorns and nanocorkscrews, as well as other configurations, each having at least one dimension on the nano scale.

With respect to nanotubes in particular, single-walled (SW) or multiple-walled (MW) nanotubes are seamless cylindrical or tubular allotropes of graphene, most typically graphitic carbon, although other elemental materials such as boron and silicon, or oxides or nitrides thereof such as boron nitride and silicon oxide, may also be used depending on the particular application and/or the intended use. Due in part to the configurability of the honeycomb lattice structure of a sheet of graphene, nanotubes exhibit outstanding electrical, mechanical, chemical, thermal, and other intrinsic properties. The internal structure of a given carbon nanotube can be configured to be electrically conductive, semi-conductive, or insulating, thereby giving rise to a host of beneficial uses and applications. In contrast, boron nitride nanotubes or nanosheets have a high thermal conductivity, but are electrically insulating.

In the semiconductor industry in particular, nanotubes are being considered as potential replacements for silicon, which is presently approaching the scaling limit as projected by Moore's Law. There are a number of key criteria for any suitable replacement material for silicon. For example, an ideal semiconducting material should have a relatively high electrical permittivity, good thermodynamic stability, high interface quality, and optimal process compatibility. Of these characteristics, electrical permittivity is of particular importance in the design of capacitors and other electronic components and devices.

The electrical permittivity of any substance is a property that is intrinsic to the material itself, and that is independent of the thickness of the material. In general terms, electrical permittivity describes the manner in which a particular dielectric material affects an incident electric field. An ideal dielectric would therefore have a relatively high energy storage value accompanied by minimal electrical losses. However, in most naturally-occurring dielectrics a relatively high energy storage value typically coincides with relatively high electrical losses, which can potentially render an otherwise satisfactory dielectric less than optimal when it is used for certain purposes or applications.

SUMMARY OF THE INVENTION

Accordingly, an engineered insulating material or dielectric is provided having a polymer base material or matrix that is intermixed or combined with a plurality of nanomaterials, nanostructures, or nanosubstrates having an aspect ratio greater than approximately 10:1. Nanoscale inclusions, nodules, or particles of an elemental metal, a metal oxide, or a metal alloy, hereinafter referred to as nanoparticles for simplicity, are deposited onto the network of nanosubstrates prior to mixing with the polymer matrix. After mixing, the network of nanosubstrates is preferentially aligned with respect to an incident electrical field. The energy storage term or value of the electrical permittivity of the dielectric is effectively decoupled from its electrical loss term or value, as will be described hereinbelow. Within the scope of the present invention, the decoupling effect of the energy storage value from the electrical loss value is tailorable or customizable by varying the preferred alignment of the network and/or the loading percentage of the nanoparticles, and/or by varying the size and/or distribution of the metal-based nanoparticles.

More particularly, the dielectric material includes the network of nanosubstrates, the polymer matrix, and a plurality of metallic or metal-based nanoparticles. The nanosubstrates have a predetermined loading percentage by weight with respect to a total weight of the dielectric material, and once mixed with the polymer matrix have a preferential or predetermined alignment with respect to an orientation of an electrical field that is incident to the length-wise axis or orientation of the nanosubstrates. The predetermined alignment of the network, i.e., of the nanosubstrates and any nanoparticles decorating the nanosubstrates, is substantially horizontal in one embodiment, and substantially vertical in another embodiment, although other alignments such as a longitudinal alignment are also usable within the scope of the present invention.

A method of forming a dielectric material includes depositing a predetermined quantity of metallic nanoparticles onto a predetermined quantity of nanosubstrates such that a majority of the metallic nanoparticles are placed in direct contact with the nanosubstrates. The method includes combining the nanosubstrates and the metallic nanoparticles with a polymer matrix after the metallic nanoparticles have been deposited onto the nanosubstrates, and aligning the nanosubstrates and the metallic nanoparticles in one of a generally horizontal orientation and a generally vertical orientation with respect to the orientation of a predetermined incident electric field to thereby form the dielectric material.

The above features and advantages and other features and advantages of the present invention are readily apparent from the following detailed description of the best modes for carrying out the invention when taken in connection with the accompanying drawings.

DETAILED DESCRIPTION OF THE INVENTION

Figure 1:
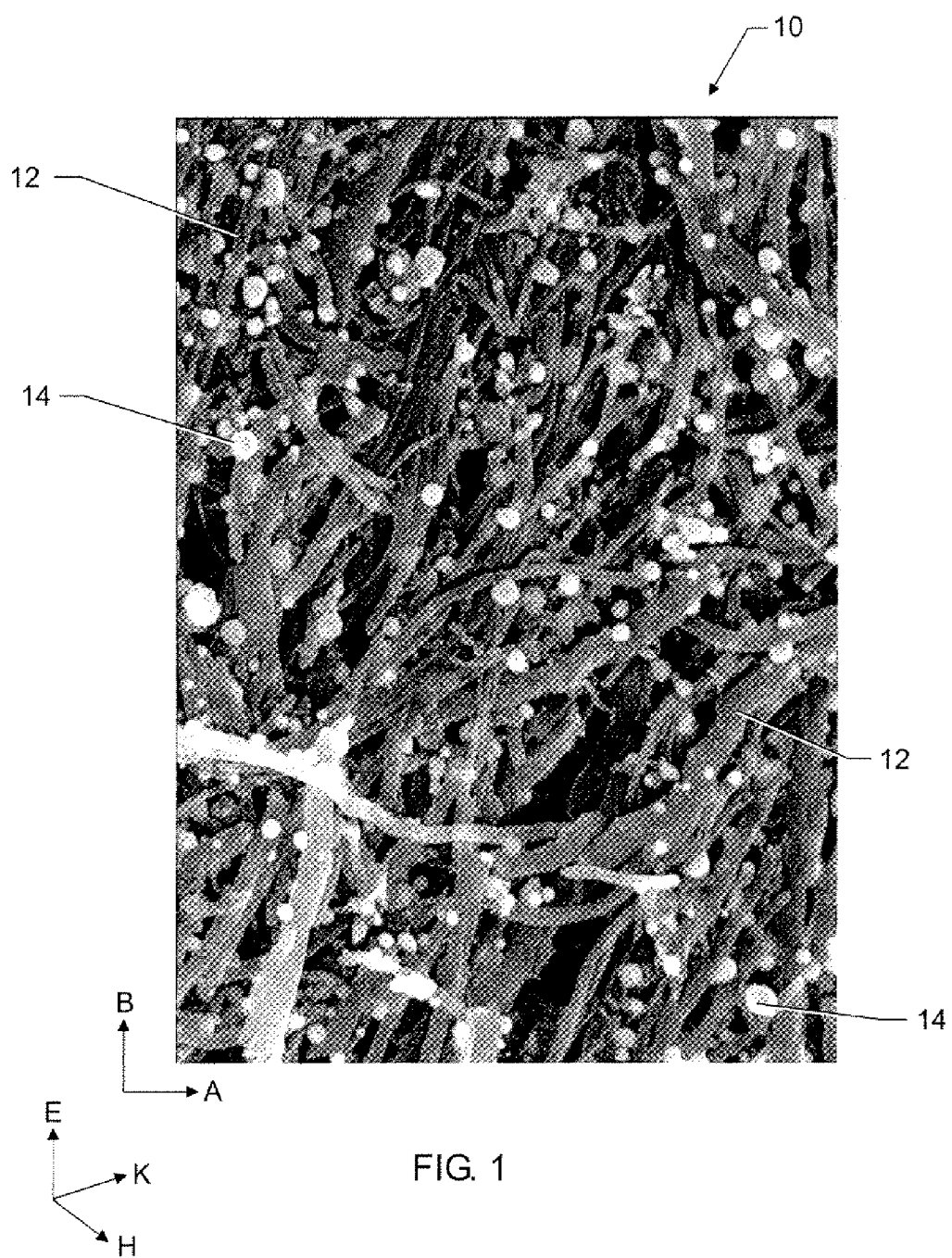
FIG. 1 is a photographic image of a representative network of nanosubstrates and nanoparticles in accordance with the present invention.

Referring to the drawings wherein like reference numbers represent like components throughout the several figures, and beginning with FIG. 1, a magnified image is shown of a representative network 10 of nanosubstrates 12. The nanosubstrates 12 have an aspect ratio of greater than 1:1, i.e., are non-spherical. In one embodiment, the aspect ratio is greater than approximately 10:1 and can include thin films, sheets, tubes, or other nanostructures of carbon, boron nitride, graphite, diamond, silicon oxide, etc. In FIG. 1, the nanosubstrates 12 are shown in an exemplary embodiment as carbon nanotubes or CNT, however other nanosubstrates are also usable within the scope of the present invention. As used herein, the term "aspect ratio" refers to the ratio of the nanosubstrate's longitudinal dimension relative to another dimension, such as thickness or width, such that a nanosubstrate 12 having an aspect ratio of 10:1 has a length that is 10 times larger than its thickness.

The term "preferentially-aligned" as used herein describes the preferred average orientation or general alignment of a longitudinal or lengthwise axis of the network 10, and in particular the nanosubstrates 12 included therein, with respect to the orientation of an incident electrical field (arrow E, shown relative to an incident magnetic field or arrow H and incident energy, or arrow K). As shown in FIG. 1, one such predetermined alignment is a generally perpendicular, normal, or horizontal alignment, although other orientations or alignments, such as a vertical alignment discussed hereinbelow with reference to FIG. 3, a longitudinal alignment (not shown), or other combinations thereof are usable within the scope of the present invention.

As will be understood by those of ordinary skill in the art, and with particular reference to the exemplary nanotube embodiment of FIG. 1, a given nanotube (NT) is an axially-symmetrical structure having a honeycomb lattice structure, which in turn exhibits a spiral conformation referred to as chirality. The chirality of a given NT can be specified using the variables n and m, which together define the Chiral vector $C_n = n\hat{a}_1 + m\hat{a}_2$, wherein $\hat{a}_1$ and $\hat{a}_2$ are unit vectors. Depending upon the particular chirality describing the structure of the NT, the structure of a given NT can be a classified as armchair, zigzag, or a chiral, each in turn having different conductive, non-conductive, or semi-conductive properties. Likewise, an NT can be constructed as either single-walled (SW) or multiple-walled (MW) NT within the scope of the present invention, of any of the possible armchair, zigzag, or chiral classifications. MWNT in particular provide additional geometrical complexity, and therefore can provide certain performance advantages.

As represented in FIG. 1 the network 10 includes a plurality of nanosubstrates 12 and a predetermined level or loading percentage of metallic or metal-based nanoinclusions, nodules, or nanoparticles 14. The nanoparticles 14 are constructed at least partially of an elemental metal, whether purely of the elemental metal, or of an alloy or an oxide of metal. As used herein, the term "preferentially-aligned" refers to the general lengthwise orientation or alignment of the network 10, i.e., of more than half of the nanosubstrates 12 and the nanoparticles 14 onto or into the network 10, to an incident electrical field, or arrow E of the electromagnetic field vector shown in FIG. 1. For example, one predetermined alignment is a horizontal alignment wherein the nanosubstrates 12 are generally aligned in a horizontal direction, or the direction indicated by arrow A. This is also the exemplary orientation shown in the image of FIG. 1. Another exemplary orientation is in a vertical direction, or the direction indicated by arrow B. Other orientations are possible within the scope of the present invention, as described below with reference to FIGS. 2-6D.

The nanoparticles 14 can be deposited onto the various nanosubstrates 12 of the network 10 prior to mixing with a polymer matrix as described below, where the nanoparticles 14 then attach or bond to the nanosubstrates 12 via intermolecular, chemical, electrostatic, and/or other attractive forces. Therefore, the elemental metal, alloy, or oxide comprising the nanoparticles 14 can be selected based on the particular beneficial electrical properties of that metal, such as conductivity or another intrinsic property, which can influence the overall performance of a dielectric 20 (see FIG. 2) in a desired manner. However attached, connected, bonded, or otherwise deposited, a majority of the nanoparticles 14 are placed in direct contact with the network 10.

Figure 2:
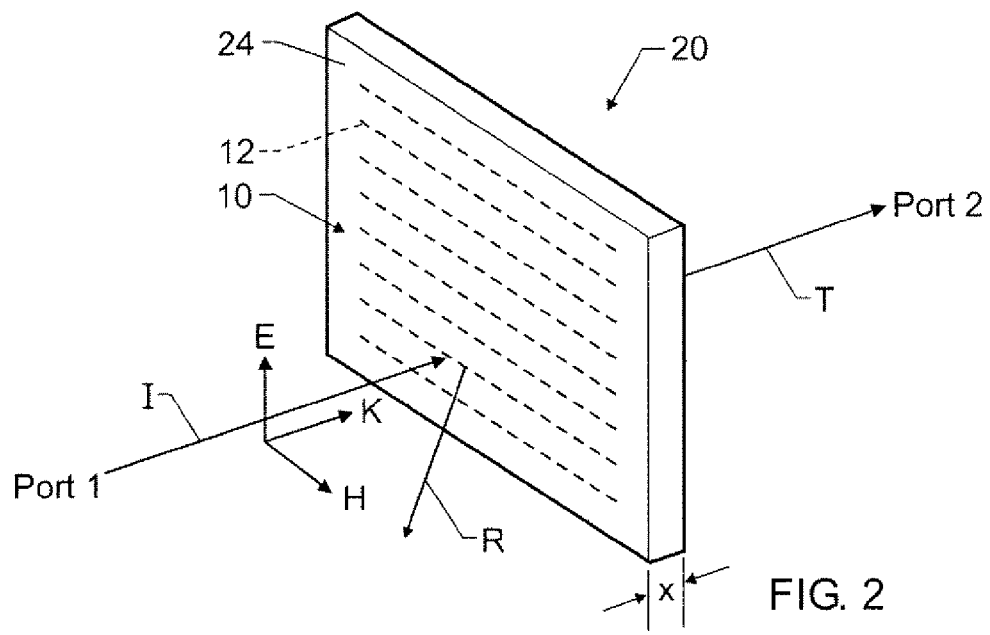
FIG. 2 is a schematic illustration of a dielectric material containing a preferentially-aligned network of nanosubstrates and nanoparticles according to one embodiment.

In one embodiment, the nanoparticles 14 are constructed of elemental silver, although other elemental metals such as nickel, cobalt, lead, gold, copper, zinc, lithium, platinum, iron, palladium, ruthenium, etc., may be used to vary or tune the properties of the dielectric 20 of FIG. 2. Likewise, the nanoparticles 14 can be constructed of a metal alloy or an oxide of metal. The average size of each of the nanoparticles 14 can vary depending on the limitations of the particular process used for depositing the nanoparticles 14 onto the nanosubstrates 12 of the network 10, as well as depending on the chemical bonds between the nanosubstrates 12 and the particular metal or metals comprising the nanoparticles 14. In an exemplary embodiment, the nanoparticles 14 are comprised partially or entirely of elemental silver. In another exemplary embodiment, the nanoparticles 14 are approximately 30 nm to approximately 70 nm, although the nanoparticles 14 are not intended to be limited to this particular size range. The various processes used for depositing the nanoparticles 14 may cause the size distribution and/or the average size of the nanoparticles 14 to vary, which in turn can vary the performance of the dielectric 20 of FIG. 2.

Accordingly, one can vary the relative sizes, composition, and/or distribution percentages of the nanoparticles 14 deposited into or onto the network 10, as well as the nanosubstrate loading percentage, i.e., the total amount or percentage by weight of the nanosubstrates 12 used within the dielectric 20 of FIG. 2. In this manner, one can effectively "tune" or select the desired electrical characteristics and/or the observed electrical phenomena of the network 10, such as the overall electrical permittivity and loss factor characteristics of any dielectric material containing the network 10 as described below. Likewise, metals having unbalanced electron spins such as iron, cobalt, nickel, etc., may influence the magnetic characteristics of the network 10, such as by influencing the permeability and magnetic loss factor, as those terms will be understood by those of ordinary skill in the art. In a similar manner, scatter parameters or S-parameters can be tuned or selected as described below.

More particularly, the unique ability to "decouple" the energy storage term or value, i.e., the e' factor, of a given material's electrical permittivity from the materials' electrical loss term or e" factor is enabled by orienting or aligning the network 10 of FIG. 1 in a preferential or predetermined manner. The electrical permittivity of a given dielectric material is often expressed via the dielectric's complex electrical permittivity (e), a term containing both an energy storage term (e') which is ideally maximized, and an electrical loss term (e"), i.e., the loss factor, which is ideally minimized. Likewise, the electrical losses can be expressed as the tangent of the dielectric loss angle ($\delta$), i.e., the loss tangent. A material's loss factor (e") is the product of its loss tangent and known dielectric constant ($e_r$), and therefore the loss factor (e") and the loss tangent (tan $\delta$) are interrelated characteristics. In most naturally-occurring materials, an increasing value for the energy storage term (e') coincides with an increase in the value of the loss factor (e"), thus resulting in a linked or coupled relationship.

The network 10 of FIG. 1 allows the energy storage and energy loss terms of a dielectric's complex permittivity, or e' and e" respectively, to be effectively decoupled from each other and independently controlled or modified so as to enable a class of engineered dielectric materials that are useful in a host of applications. Such applications can include, but are not limited to, a potential material for use in Complementary Metal-Oxide-Semiconductor (CMOS) technology, microwave engineering applications, RF communications and controls, optics, etc.

Referring to FIG. 2, the dielectric 20 discussed above includes the network 10 of FIG. 1 which is intermixed or combined within a polymer base material or matrix 24 using standard blending, mixing, compounding, and/or any other suitable means. The polymer matrix 24 is preferably a suitable engineered plastic or polymer such as but not limited to: polyamide, polyalkylvinyl acetate, polycarbonate, polyacrylate, polyacrylonitrile, polyester, polyimide, polystyrene, polyurethane, polypropylene, liquid crystalline polymer, cellulose polymer, etc., or any copolymer or combination thereof. Within the scope of the present invention, the polymer matrix 24 is not intended to be a significant contributor to the electrical performance of the dielectric 20, and therefore any polymer which has the desired effect on the overall performance of the dielectric 20 is usable within the scope of the present invention. Likewise, the thickness X of the dielectric 20 is not a significant contributor to the electrical performance of the dielectric 20, as it is known that a material's permittivity is generally independent of thickness.

Within the dielectric 20, once mixing is complete, alignment or orientation of the network 10 can be achieved via melt extrusion or a similar mechanical shearing process. In a first predetermined alignment, i.e., a generally horizontal alignment, the network 10 is horizontally aligned with respect to the orientation of the electrical field (arrow E). Incidental energy (arrow K) enters the dielectric 20 through a first port (Port 1), such as a cathode plate of a capacitor (not shown), with some portion of the incident energy (arrow K) being reflected as represented by the arrow R. Transmitted energy (arrow T) exits the dielectric 20 through a second port (Port 2), such as an anode plate of a capacitor (not shown). The reflected energy (arrow R) therefore represents electrical dissipation or loss within the dielectric 20.

Referring briefly back to FIG. 1, the nanoparticles 14 can be deposited onto the nanosubstrates 12 of the network 10 at a predetermined nanoparticle loading percentage, i.e., a percentage by weight with respect to the weight of the nanosubstrates 12, prior to orienting and combining the network 10 with the polymer matrix 24 of FIG. 2. Likewise, the percentage weight of the nanosubstrates 12 relative to the overall weight of the dielectric 20 of FIG. 2, i.e., the nanosubstrate loading percentage, can be varied in order to effectively tune the electrical properties of the dielectric 20. For example, elemental silver can be used to form the nanoparticles 14, with the resultant dielectric 20 (see FIG. 2) being subjected to incident energy (arrow K) of various frequencies, such as X-band frequencies of the electromagnetic spectrum as represented by FIGS. 4A-D, 5A-D, and 6A-D described below. However, the dielectric 20 of FIG. 2 is not limited to use with X-band frequencies, as the tunable characteristics disclosed herein can also be observed across most of the electromagnetic spectrum, and in particular the microwave, the infrared, and the optical regions thereof.

Figure 3:
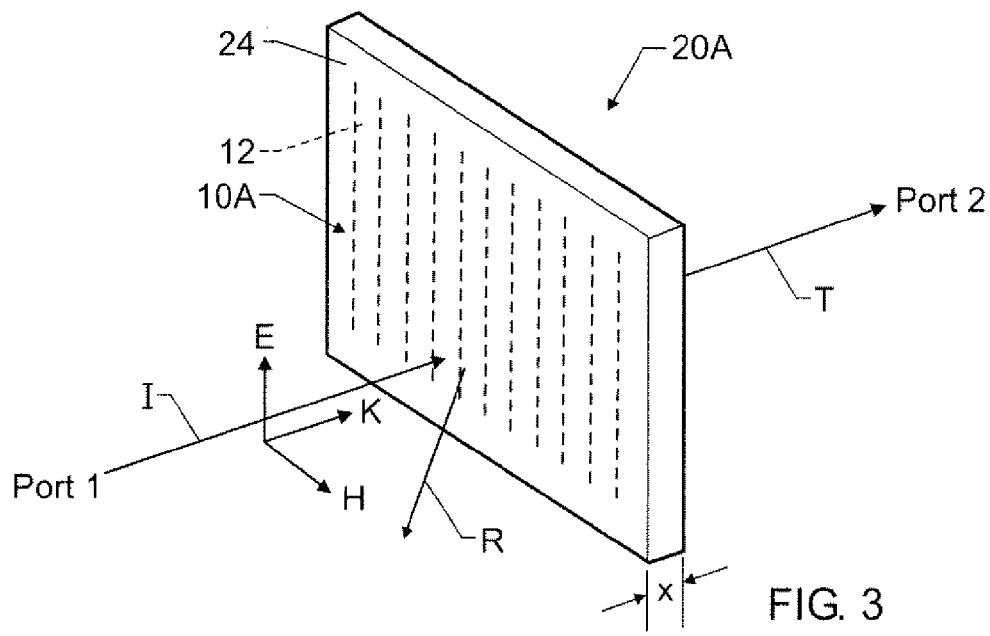
FIG. 3 is a schematic illustration of another embodiment of the dielectric material of FIG. 2.

Referring to FIG. 3, an alternate dielectric 20A includes the network 10 of FIG. 1 in a vertical orientation, referred to in FIG. 3 as the network 10A for clarity. As with the horizontal alignment of FIG. 2, which is oriented or aligned generally along the direction of arrow A of FIG. 1, the nanosubstrates 12 of FIG. 2 are aligned longitudinally along the direction of arrow B of FIG. 1. Prior to alignment, the network 10A is embedded within or combined with a polymer matrix 24 as discussed above with reference to FIG. 2. In other words, the network 10A is oriented in a second predetermined alignment, i.e., a generally vertical alignment with respect to the orientation of the electrical field (arrow E). Incident energy (arrow I) enters the network 10A in the direction of arrow K, through a first port (Port 1) as described above, with some portion of the incident energy being reflected or lost as represented by arrow R. Transmitted energy (arrow T) exits the dielectric 20A through a second port (Port 2) as described above. The reflected energy (arrow R) represents the electrical dissipation or loss within the dielectric 20A.

Figure 4A:
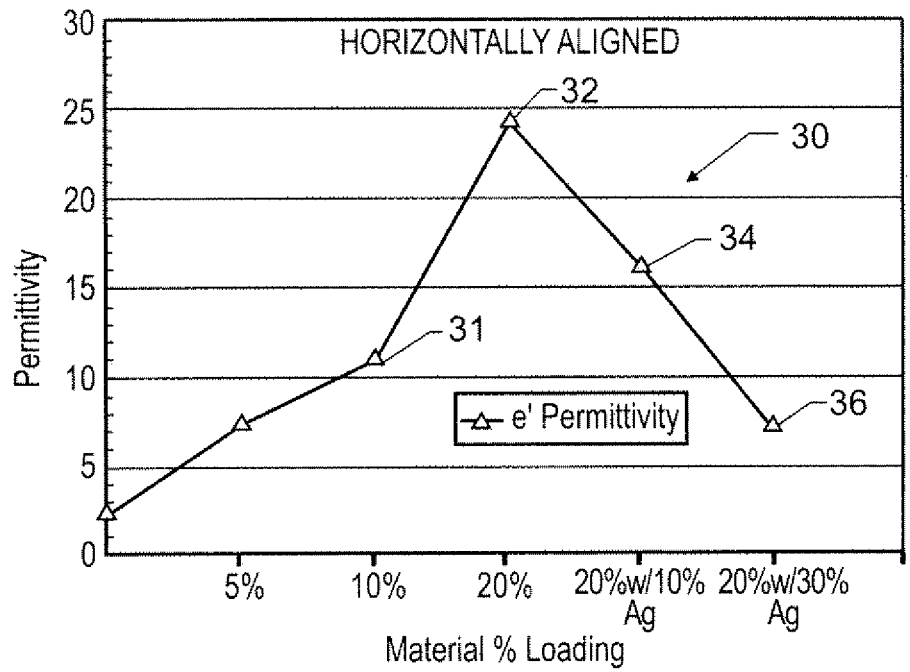
FIG. 4A is a graphical illustration of the effects of different material loading levels or percentages on the electrical permittivity of the dielectric material of FIG. 2.

Referring to FIG. 4A, a graph 30 describes an exemplary set of observed electrical phenomenon in a horizontally-aligned network 10, such as is shown in FIG. 2. The magnitude of the energy storage term (e') of the complex permittivity of the dielectric 20 of FIG. 2 is plotted against the material loading percentage used therein, which varies from 0% content of nanosubstrates 12 in the dielectric 20 of FIG. 2, i.e., 100% polymer matrix 24, to 20% content of the nanosubstrates 12 and 80% content of polymer matrix 24. The 20% loading level of the nanosubstrates 12 within the dielectric 20 of FIG. 2 is then combined with increasing loading percentages of the nanoparticles 14 of FIGS. 1 and 2. While the data presented in graph 30 corresponds to nanoparticles 14 formed of elemental silver of approximately 25 nm to approximately 45 nm, the trends and general patterns of observed data presented in graph 30 are exemplary, with silver of this particular size range being just one possible embodiment.

In FIG. 4A, the magnitude of the energy storage term (e') is at an observed minimum when a 0% content of the nanosubstrates 12 is used. As the content or loading percentage of nanosubstrates 12 used in the dielectric 20 of FIG. 2 is increased to 5%, the magnitude of the energy storage term (e') approximately doubles, increasing yet again by approximately 50% as the loading percentage increases to 10%. At 20% loading of the nanosubstrates 12, the magnitude of the energy storage term (e') increases to a peak magnitude (point 32).

Between point 31, i.e., 10% content or percentage loading of nanosubstrates 12, and point 32, i.e., 20% content or percentage loading of nanosubstrates 12, the permittivity rapidly increases. This indicates that nanosubstrate loading alone is insufficient, as permittivity levels quickly become unacceptably high. Therefore, at point 32, the nanoparticles 14 (see FIG. 1) are added to the network 10. The nanoparticle loading percentage starts at 10%, although lower loading percentages can be used within the scope of the present invention, and is gradually increased to 30%. The magnitude of the energy storage term (e') is clearly reduced by the presence of the nanoparticles 14, with the magnitude at point 32 dropping by approximately 33% at point 34. However, at 20% loading of nanosubstrates 12 and 10% loading of the nanoparticles 14, the magnitude of the energy storage term (e') remains relatively high compared to the 0%, the 5%, and the 10% nanosubstrates 12. At point 36, which corresponds to a 30% loading of the nanoparticles 14, the magnitude of the energy storage term (e') is approximately equal to that of the 5% loading of the nanosubstrates 12.

Figure 4B:
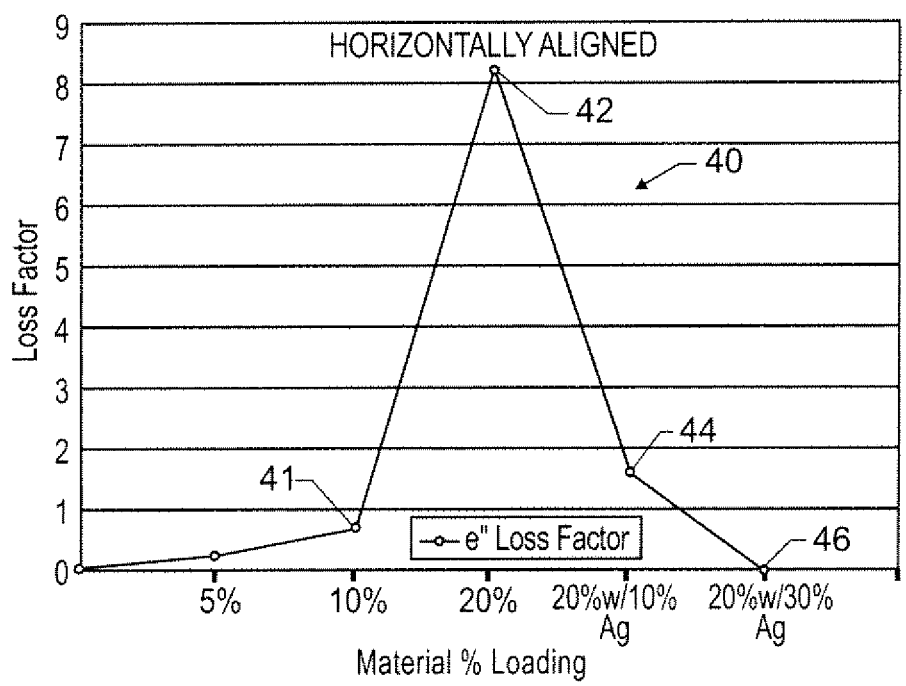
FIG. 4B is a graphical illustration of the effects of different material loading levels or percentages on the loss factor of the dielectric material of FIG. 2.

Referring to FIG. 4B, the tunable decoupling effect of the nanoparticles 14 discussed above is also shown in a graph 40, which describes a different exemplary set of observed electrical phenomena in the horizontally-aligned network 10 of FIGS. 1 and 2. In graph 40, the magnitude of the energy loss term (e") is plotted against the material loading percentage, which like FIG. 3A varies from a 0% content of nanosubstrates 12 in the dielectric 20 of FIG. 2, i.e., 100% polymer matrix 24, to a 20% nanosubstrate content and an 80% polymer matrix 24 content.

At point 32 of FIG. 4A, a maximum value of the energy storage term (e') is attained. However, as the correspondingly high amplitude of point 42 of FIG. 4I indicates, this potentially desirable increase in the energy storage value (e') of FIG. 4A comes with a tradeoff in the form of substantially higher losses in the dielectric 20. Therefore, it can be desirable to decouple the energy storage term (e') from the loss term (e"), a result that is produced in part by the introduction of properly-selected nanoparticles 14 to the network 10 (see FIG. 1) as described above.

Still referring to FIG. 4B, as dramatically as the increase in the loss factor (e") occurs as the loading percentage of the nanosubstrates 12 in the dielectric 20 of FIG. 2 increases from 10% loading at point 41 to 20% loading at point 42, the magnitude of the loss factor (e") is clearly reduced by the introduction of the nanoparticles 14 (see FIG. 1) into the network 10 (see FIG. 2). At 10% loading of the nanoparticles 14 at point 44, the loss factor (e") is reduced by approximately 75%, with only an approximately 30% reduction in the magnitude of the energy storage term (e') (see FIG. 3A). At point 46, the loss factor (e") is effectively reduced to zero. Therefore, by varying the loading percentages of the nanoparticles 14 (see FIG. 1) in the dielectric 20 of FIG. 2, the loss factor (e") is minimized without unduly minimizing the value of the energy storage term (e') (see FIG. 3A).

Figure 4C:
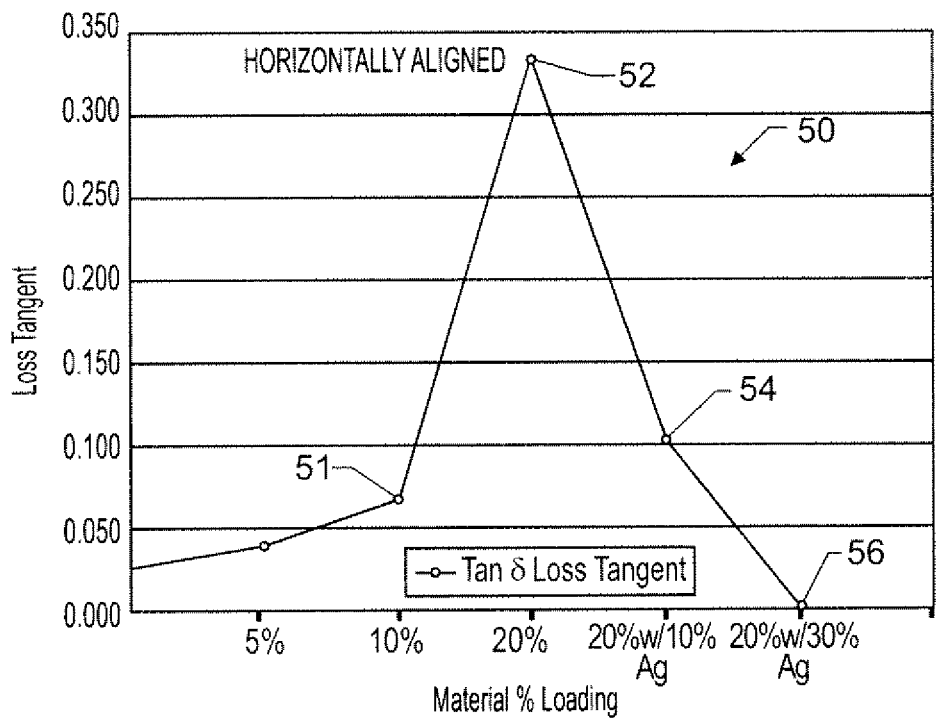
FIG. 4C is a graphical illustration of the effects of different material loading levels or percentages on the loss tangent of the dielectric material of FIG. 2.

Referring to FIG. 4C, another graph 50 is presented which describes a different set of exemplary observed electrical phenomenon in the horizontally-aligned network 10 of FIGS. 1 and 2. Here, the magnitude of the loss tangent (tan δ) is plotted against the material loading percentage, which again varies from 100% polymer matrix 24 to 20% content of the nanosubstrates 12 in the dielectric 20 (see FIG. 2). As with FIG. 4B, the loss tangent (tan δ) increases sharply from point 51, which corresponds to a loading percentage of 10% nanosubstrates 12 by weight, to point 52, which corresponds to a material loading percentage of 20% nanosubstrates 12 by weight. As with the phenomena exemplified in FIG. 4B, the magnitude of the loss tangent (tan δ) is reduced by approximately 70% by introducing the nanoparticles 14 (see FIG. 1) into a horizontally-aligned network 10 (see FIG. 2). At 30% loading of nanoparticles 14, the loss tangent (tan δ) is effectively reduced to zero, albeit with some additional but minimal reduction in the magnitude of the energy storage term (e') (see FIG. 3A).

Figure 4D:
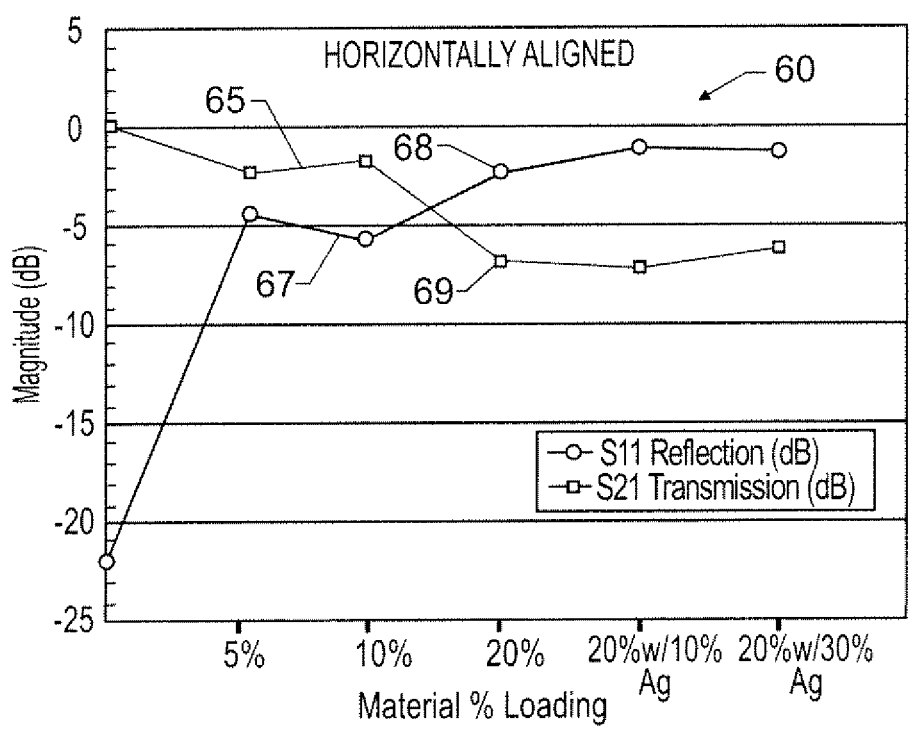
FIG. 4D is a graphical illustration of the effects of different material loading levels or percentages on the scattering parameters (S-Parameters) of the dielectric material of FIG. 2.

Referring to FIG. 4D, a graph 60 is presented which describes a different set of exemplary observed electrical phenomena in the horizontally-aligned network 10 of FIGS. 1 and 2, i.e., the scatter parameters or S-Parameters. As will be understood by those of ordinary skill in the art, S-parameters describe the scattering and reflection of high-frequency traveling waves within a transmission line in the form of reflection and transmission coefficients. The magnitudes of each of the reflection coefficients (trace 67) and transmission coefficients (trace 65) of the network 10 is plotted in graph 60 against the same material loading percentages discussed above with reference to FIGS. 4A-C.

As shown in FIG. 4D, increased loading percentages of the nanosubstrates 12 within the dielectric 20 of FIG. 2 generally reduces the transmission coefficient (trace 65) while increasing the reflection coefficient (trace 67), a potentially undesirable tradeoff. However, as the nanoparticles 14 (see FIG. 1) are added to the dielectric 20 of FIG. 2 at points 68 and 69, the transmission coefficient (trace 65) and the reflection coefficient (trace 67) each remain relatively unchanged. That is, the potential performance benefits provided by the introduction of the nanoparticles 14 of FIG. 1 as exemplified in FIGS. 4A-C are not themselves adversely affected by a corresponding degradation in the S-parameters of FIG. 3D, which is itself a potentially useful characteristic.

Figure 5A:
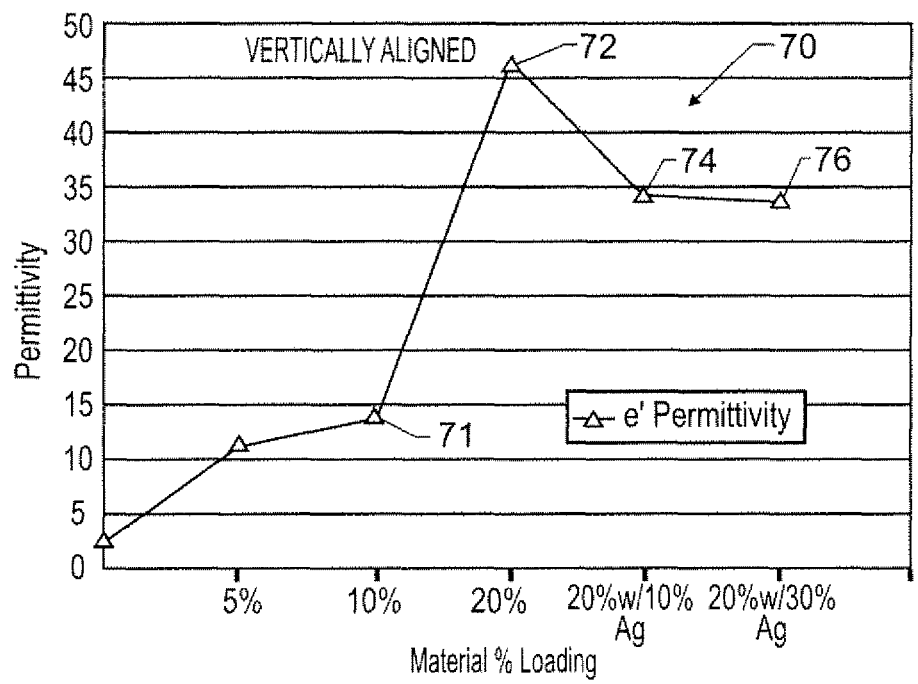
FIG. 5A is a graphical illustration of the effects of different material loading levels or percentages on the electrical permittivity of the dielectric material of FIG. 3.

Referring to FIGS. 5A-D, a set of graphs 70, 80, 90, and 100 are respectively presented, with each of the graphs 70, 80, 90, and 100 corresponding respectively to the graphs 30, 40, 50, and 60 of FIGS. 4A-D discussed above, with the exception of the orientation of the network 10A being generally vertical as shown in FIG. 3. As with FIG. 4A, FIG. 5A shows that the magnitude of the energy storage term (e') increases or spikes dramatically as the loading percentage of the nanosubstrates 12 within the dielectric 20A increases from 10% at point 71 to 20% at point 72. With such vertical alignment, this magnitude decreases somewhat (point 74) with a 10% loading of the nanoparticles 14 (see FIG. 4), but remains substantially higher than the magnitude represented by point 71. Additional loading (point 76) is observed to have a negligible effect on the magnitude of the energy storage value (e').

Figure 5B:
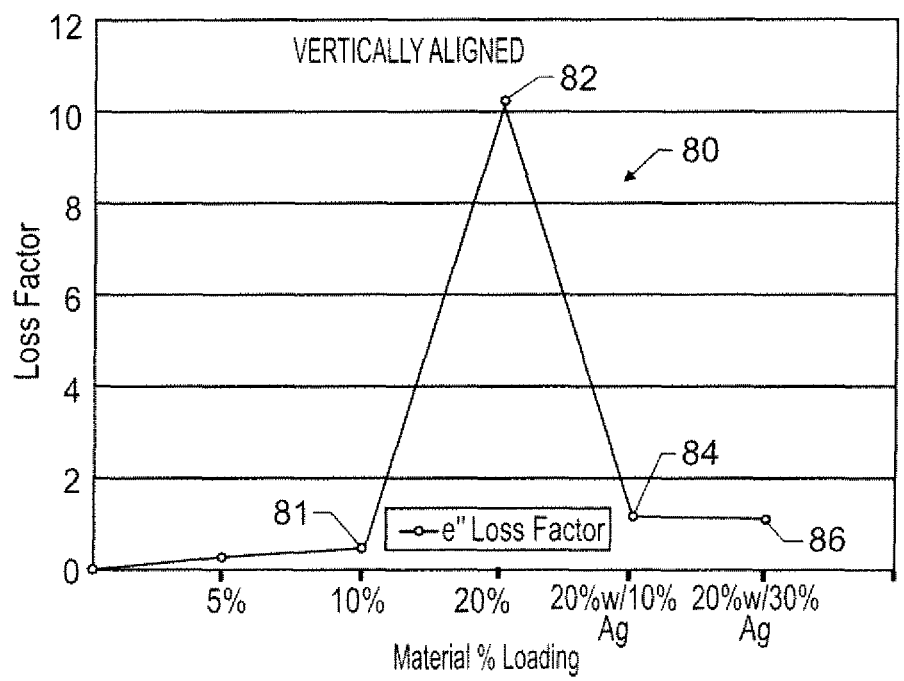
FIG. 5B is a graphical illustration of the effects of different material loading levels or percentages on the loss factor of the dielectric material of FIG. 3.
Figure 5C:
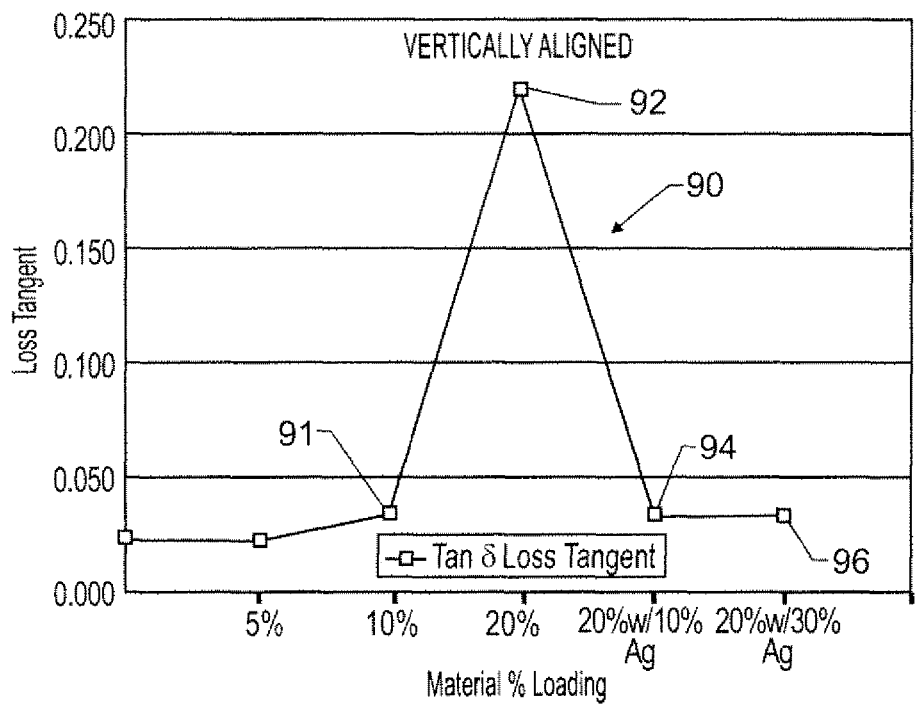
FIG. 5C is a graphical illustration of the effects of different material loading levels or percentages on the loss tangent of the dielectric material of FIG. 3.

Referring to FIGS. 5B and 5C together, the loss factor (e") increases dramatically from point 81 or 10% loading, to point 82 or 20% loading. However, the loss factor (e") is substantially reduced at point 84 with the introduction of the nanoparticles 14 (see FIG. 1) at 10% loading. In the exemplary data of FIG. 5B, an approximately 90% reduction in the value of the loss factor (e") is observed between points 82 and 84, which corresponds to a substantially lower reduction in the magnitude of the energy storage term (e') in FIG. 6A. Likewise, in FIG. 5C an approximately 90% reduction in the loss tangent (tan δ) is observed between a peak value at point 92 and the magnitude at point 94, or 20% loading with 10% loading of the nanoparticles 14 (see FIG. 4). Additional nanoparticle loading percentages are observed to have a negligible effect on the loss factor (e") and the loss tangent (tan δ), as represented by the similar magnitudes of points 84 and 86 (FIG. 5B) and points 94 and 96 (FIG. 5C).

Figure 5D:
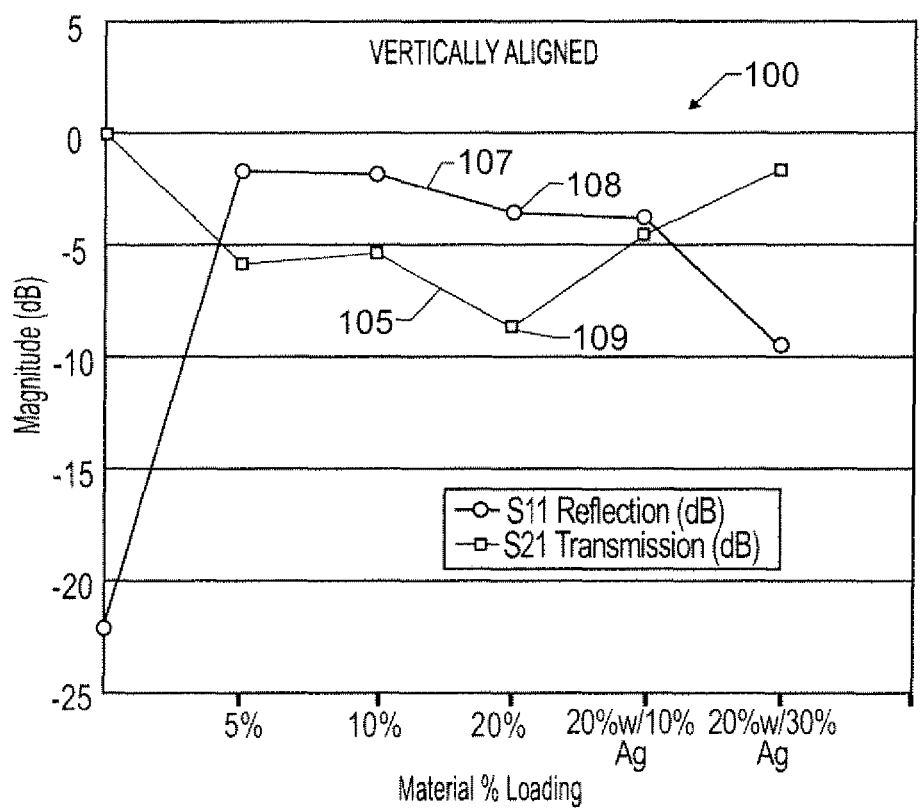
FIG. 5D is a graphical illustration of the effects of different material loading levels or percentages on the S-Parameters of the dielectric material of FIG. 3.

Referring to FIG. 5D, the magnitudes of each of the reflection coefficient (trace 107) and the transmission coefficient (trace 105) of the network 10A is plotted in graph 100 against the same material loading percentages discussed above with reference to FIGS. 5A-C. Increased loading percentages of the nanosubstrates 12 beyond 5% loading within the dielectric 20A of FIG. 3 generally reduces the transmission coefficient (trace 105) while in this instance also generally reducing the reflection coefficient (trace 107). However, as the nanoparticles 14 (see FIG. 1) are added at points 108 and 109, the transmission coefficient (trace 105) trends upward, while the reflection coefficient (trace 107) trends downward, a potentially useful electrical phenomenon. That is, the potential performance benefits provided by the additional loading of the nanoparticles 14 of FIG. 1 as exemplified in FIGS. 5A-C are not adversely affected by a corresponding degradation in the S-parameters of FIG. 5D.

Figure 6A:
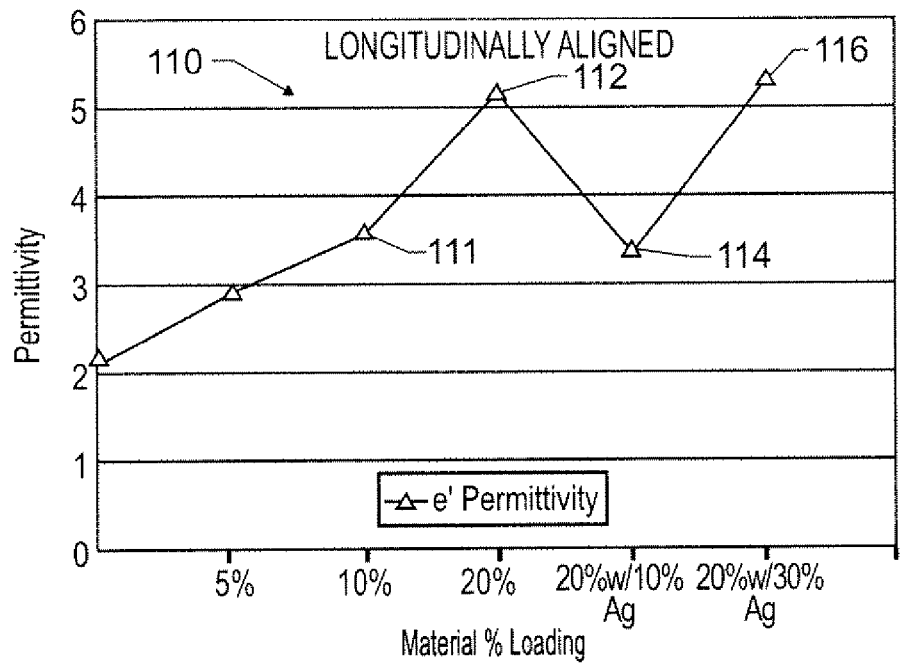
FIG. 6A is a graphical illustration of the effects of different material loading levels or percentages on the permittivity of a dielectric material that is preferentially-aligned in a longitudinal manner.

Referring to FIGS. 6A-D, a set of graphs 110, 120, 130, and 140 are respectively presented, with each of the graphs 110, 120, 130, and 140 corresponding respectively to the graphs 30, 40, 50, and 60 of FIGS. 4A-D discussed above, with the exception of the orientation of the nanosubstrates 12 of FIGS. 1-3 being generally longitudinal with respect to the orientation of an electrical field (arrow E). FIG. 6A shows that the energy storage term (e') increases as the loading percentage of the nanosubstrates 12 increases from 10% as point 111 to 20% at point 112. With longitudinal alignment, this magnitude decreases by approximately 40% between points 112 and 114 as the loading of nanoparticles 14 (see FIG. 1) increase to 10%. However, additional loading (point 116) to 30% in this alignment increases the magnitude of the energy storage value (e') at point 116 to slightly above its initial peak at point 112.

Figure 6B:
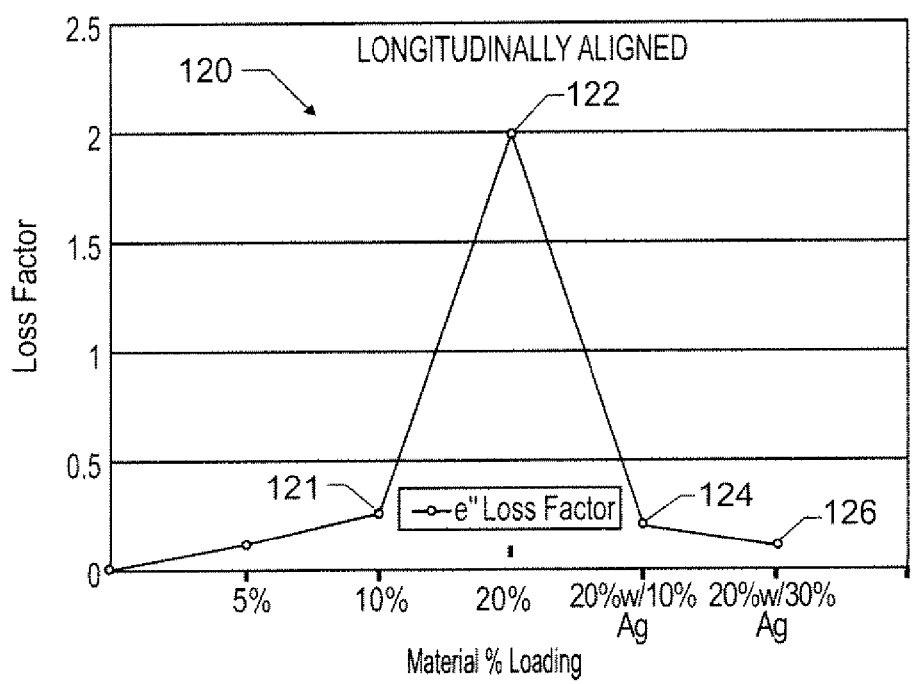
FIG. 6B is a graphical illustration of the effects of different material loading levels or percentages on the loss factor of the dielectric material represented in FIG. 6A.
Figure 6C:
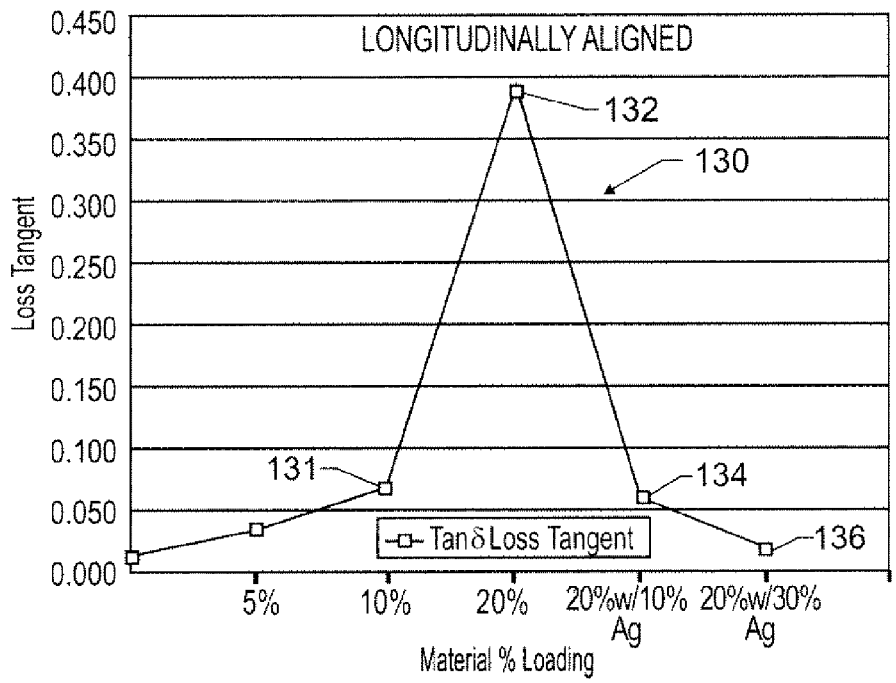
FIG. 6C is a graphical illustration of the effects of different material loading levels or percentages on the loss tangent of the dielectric material represented in FIGS. 6A and 6B.

Referring to FIGS. 6B and 6C together, the loss factor (e") increases dramatically from point 121, or 10% loading, to point 122, or 20% loading. However, the loss factor is substantially reduced at point 124 with the introduction of the nanoparticles 14 (see FIG. 1) at 10% loading. In the exemplary data of FIG. 6B, an approximately 90% reduction in loss factor is observed between points 122 and 124, which corresponds to a substantially lower reduction in the magnitude of the energy storage term (e') in FIG. 6A.

Likewise, in FIG. 6C a sharp increase in loss tangent occurs from point 131 to point 132, followed by an approximately 90% reduction in loss tangent between point 132 and the magnitude at point 134, or 20% loading with 10% loading of the nanoparticles 14 (see FIG. 1). Additional loading percentages of the nanoparticles 14 is observed to further reduce the magnitude of the loss tangent (e''') from the magnitude at point 134 to a lower magnitude at point 136, while the same increase in loading percentage of the nanoparticles 14 (see FIG. 1) results in an observed secondary increase in the magnitude of the energy storage term (e') between points 114 and 116 of FIG. 7A.

Figure 6D:
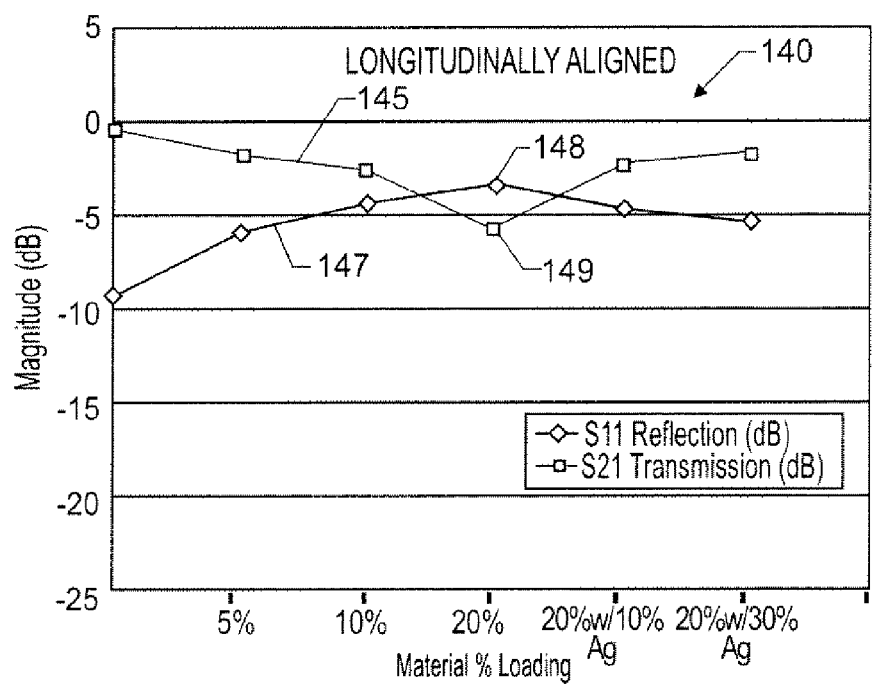
FIG. 6D is a graphical illustration of the effects of different material loading levels or percentages on the S-Parameters of the dielectric material represented in FIGS. 6A, 6B, and 6C.

Referring to FIG. 6D, the magnitudes of each of the refection coefficient (trace 147) and transmission coefficient (trace 145) of a longitudinally-aligned network (not shown) is plotted in graph 140 against the same material loading percentages discussed above with reference to FIGS. 6A-C. Increased nanosubstrate loading percentages from 0% to 20% (points 148 and 149) generally reduces the transmission coefficient (trace 149) and increases the reflection coefficient (trace 147). However, as the nanoparticles 14 (see FIG. 1) are added starting at points 148 and 149, the transmission coefficient (trace 145) trends upward, while the reflection coefficient (trace 147) trends slightly downward before leveling off, a potentially useful phenomenon. That is, the potential performance benefits provided by the additional loading of the nanoparticles 14 of FIG. 1 as exemplified in FIGS. 6A-C are not adversely affected by a corresponding degradation in the S-parameters of FIG. 6D.

As disclosed hereinabove, a dielectric can be formed with preferentially-aligned nanotubes of carbon or other suitable materials, such as the nanosubstrates 12 of FIG. 1, which are aligned preferentially in a network such as networks 10 and 10A of FIGS. 2 and 3, respectively, or longitudinally (not shown) with respect to an orientation of an electric field present therewithin. Prior to alignment, a predetermined percentage of metallic inclusions, nodules, or nanoparticles, such as the nanoparticles 14 of FIG. 1, are deposited or otherwise positioned onto the nanosubstrates 12. These nanoparticles 14 act in conjunction with the predetermined alignment of the nanosubstrates 12 to decouple the real part of electrical permittivity, i.e., the energy storage term (e'), from the imaginary part, i.e., the energy loss term (e"), thus allowing for potential development, application, and incorporation of these engineered materials into a broad range of products.

Also explained hereinabove, the electrical properties of the resultant dielectrics 20, 20A of FIGS. 2 and 3, respectively, can be varied by selecting an appropriate loading percentage for the nanoparticles 14 of FIG. 1 for a particular application. The type of metal used for the nanoparticles 14 of FIG. 1, as well as other factors such as the size of the nanoparticles 14 and the length and/or orientation of the nanosubstrates 12 of FIGS. 1-3, allow a user to tune the performance of the engineered material for a host of different applications.

While the best modes for carrying out the present invention have been described in detail, those familiar with the art to which this invention relates will recognize various alternative designs and embodiments for practicing the invention within the scope of the appended claims.

What is claimed as new and desired to be secured by Letters Patent of the United States is:

1. A mechanically-aligned dielectric material comprising:
a length-wise aligned network of nanosubstrates each having an aspect ratio greater than approximately 10:1;
a plurality of nanoparticles constructed at least partially of an elemental metal, wherein a majority of the plurality of nanoparticles are in direct contact with the network of nanosubstrates; and
a polymer matrix intermixed with the network of nanosubstrates and the plurality of nanoparticles form the mechanically-aligned dielectric material wherein the dielectric material has a nanosubstrate loading percentage of 15% to 25% by weight with respect to a total weight of the dielectric material and a nanoparticle loading percentage of 10% to 30% by weight with respect to a total weight of the nanosubstrates;
wherein the network has a predetermined nanosubstrate loading percentage by weight with respect to a total weight of the dielectric material; and wherein:
nanosubstrates are aligned such that when an electric field is applied to the dielectric material in a direction that is horizontal to the alignment of the nanosubstrates, the dielectric material exhibits an energy storage value and an electrical loss value, and the energy storage value is decoupled from the electrical loss value.

2. The dielectric material of claim 1, wherein the plurality of nanoparticles are constructed solely of the elemental metal.

3. The dielectric material of claim 2, wherein the elemental metal is silver.

4. The dielectric material of claim 2, wherein the nanoparticles have an average diameter of approximately 30 nanometers to approximately 70 nanometers.

5. The dielectric material of claim 1, wherein the network of nanosubstrates is constructed primarily of multiple-walled nanotubes.

6. A mechanically-aligned dielectric material comprising:
a length-wise aligned network of nanosubstrates having a substantially horizontal alignment intersecting an orientation of an electrical field applicable to the dielectric material, wherein the nanosubstrates have an aspect ration greater than approximately 10:1 and wherein the nanosubstrates are configured as at least one of single-walled carbon nanotubes (SWCNT) multiple-walled carbon nanotubes (MWCNT) or combinations thereof;
nanoparticles of an elemental metal deposited onto the network of nanosubstrates; wherein the dielectric material has a nanosubstrate loading percentage of 15% to 25% by weight with respect to a total weight of the dielectric material and a nanoparticle loading percentage of 10% to 30% by weight with respect to a total weight of the nanosubstrates and
a polymer matrix intermixed with each of the network of nanosubstrates and the nanoparticles to thereby form the mechanically-aligned dielectric material and wherein the nanosubstrates are aligned such that when an electric field is applied to the dielectric material in a direction that is horizontal to the alignment of the nanosubstrates, the dielectric material exhibits an energy storage value and an electrical loss value, and the energy storage value is decoupled from the electrical loss value.

7. The dielectric material of claim 6, wherein the elemental metal is silver.

8. The dielectric material of claim 7, wherein the nanoparticles have an average diameter of approximately 30 nanometers to approximately 70 nanometers.

9. A method of forming the mechanically aligned dielectric material of claim 1, comprising:
depositing a. predetermined quantity of metallic nanoparticles onto a predetermined quantity nanosubstrates such that a majority of the metallic nanoparticles are placed in direct contact with the nanosubstrates;
combining the nanosubstrates and the metallic nanoparticles with a polymer matrix after the metallic nanoparticles have been deposited onto the nanosubstrates; and
mechanically aligning the polymer matrix, the nanosubstrates, and the metallic nanoparticles to form a lengthwise aligned network of nanosubstrates having a generally horizontal orientation with respect to the orientation of a predetermined incident electric field to thereby form the mechanically aligned dielectric material.

10. The method of claim 9, wherein the weight of the predetermined quantity of nanosubstrates is approximately 15 percent to approximately 25 percent of the combined weight of the dielectric material.

11. The method of claim 10, wherein the plurality of nanosubstrates include multiple-walled carbon nanotubes (MWCNT).

12. The method of claim 10, wherein depositing the predetermined quantity of metallic nanoparticles deposited onto the nanosubstrate equals approximately 10 percent to approximately 30 percent by weight of the nanosubstrate.

13. The method of claim 12, wherein the metallic nanoparticles are constructed at least partially of elemental silver.

14. The method of claim 13, wherein the- metallic nanoparticles have an average diameter of approximately 30 nanometers to approximately 70 nanometers.

* * * * *